F. A. FISCHER.
Condensing and Feed Apparatus for Steam-Boilers.
No. 139,136. Patented May 20, 1873.

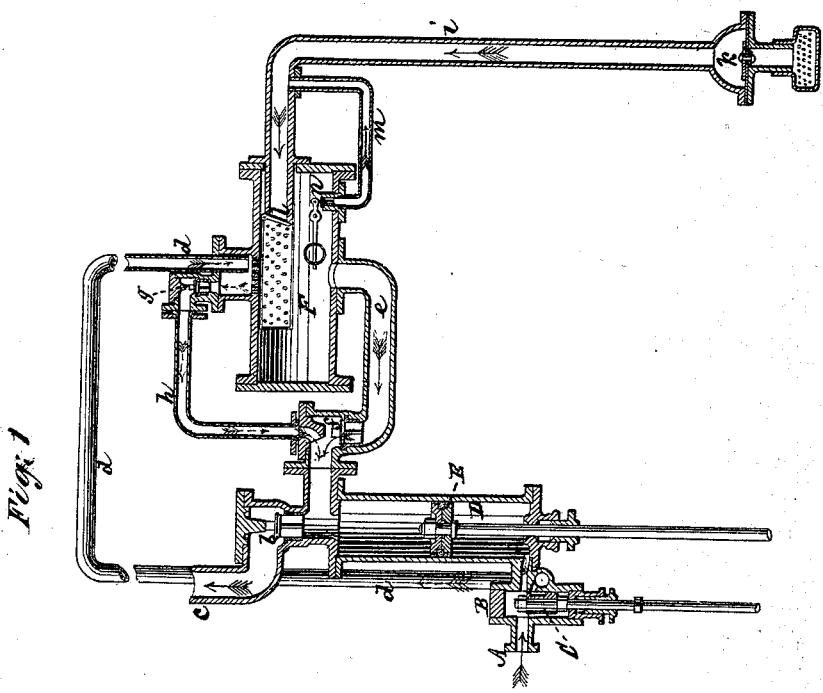

UNITED STATES PATENT OFFICE.

FRIEDRICH AUGUST FISCHER, OF HARZBURG, GERMANY.

IMPROVEMENT IN CONDENSING AND FEED APPARATUS FOR STEAM-BOILERS.

Specification forming part of Letters Patent No. 139,136, dated May 20, 1873; application filed November 30, 1872.

*To all whom it may concern:*

Be it known that I, FRIEDRICH AUGUST FISCHER, of Harsburg, in the Duchy of Brunswick, Empire of Germany, have invented certain Improvements in Condensing Apparatus for Use in Connection with Steam-Engines or their Pistons, applicable for feeding water to steam-boilers and other purposes, of which the following is a specification:

This invention consists in certain combinations and arrangements of parts whereby the steam, after it has performed its duty on a piston in a cylinder—that is, after it has moved the piston to the end of its stroke—passes to a condenser connected with a pump, and not only causes the atmospheric pressure on the engine-piston to be counterbalanced, but by the vacuum produced, and without any extra pump or other special means, induces an upward flow of the water or other substance to be raised to a height proportionate with that of the vacuum.

Figure 3:
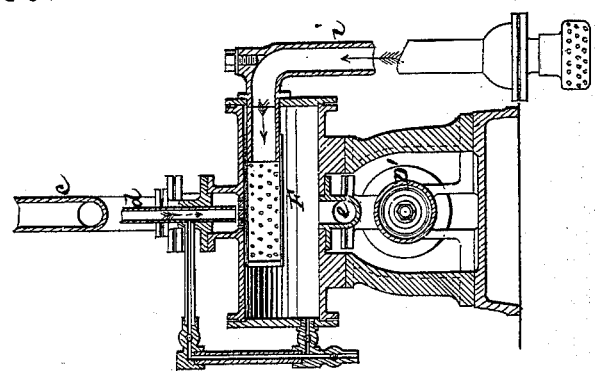
Figure 2:
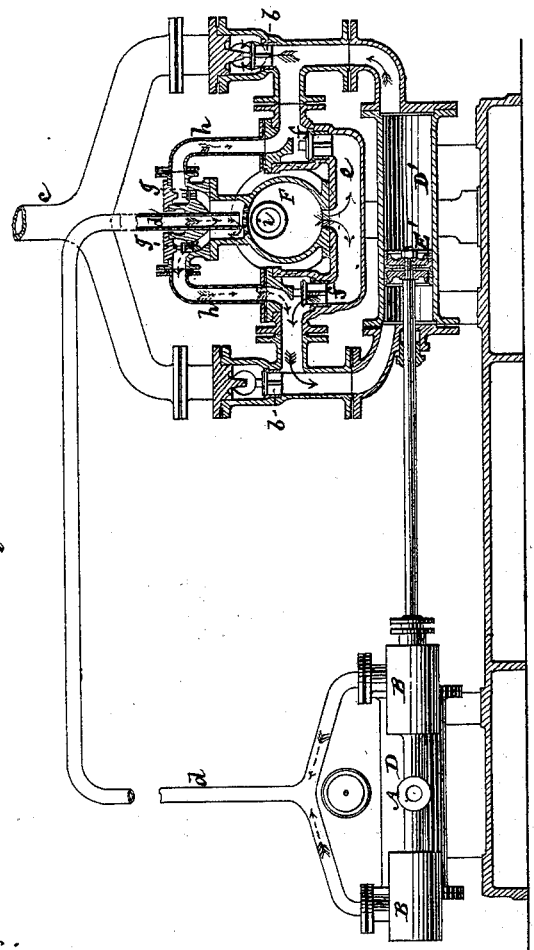

In the accompanying drawing, which forms part of this specification, Figure 1 represents a sectional elevation of an apparatus constructed in accordance with my invention; Figs. 2 and 3, sectional elevations at right angles to each other, on the lines $xx$ and $yy$ of a modification of the same.

Referring, in the first instance, to Fig. 1, A is a steam pipe or inlet from a boiler to a valve-chest, B, the valve C of which, when open, passes the steam to a cylinder, D, below a piston, E, raising the latter, and lifting a body of water within the cylinder and above the piston. Said water thus raised is passed through a valve, $b$, and up a rising pipe, $c$, to a height corresponding with the pressure of the steam on the piston. The valve C being now shifted so as to shut off further ingress of steam to the cylinder, the valve $b$ closes, and the water is cut off in the rising pipe $c$, while the steam previously admitted to the cylinder leaves the latter, and passes, by a pipe, $d$, to a condenser, F, containing water. This equalizes the pressure in the cylinder D, below the piston E, and in the condenser F, whereby the effect of the vacuum is interrupted. The condenser F being arranged at a greater altitude than the cylinder D, the water in the condenser F will escape by a pipe, $e$, and through a valve, $f$, and over or onto the descending piston E, again charging the cylinder D with water above the piston. While this action is taking place the steam escaping at the pipe $d$ passes through a valve, $g$, and through a pipe, $h$, and, mingling with the water as it escapes through the valve $j$, causes the steam to be rapidly and effectually condensed. By the vacuum thus produced water is raised up a lower pipe, $i$, from a well or other source of supply, said pipe being provided with a foot-valve, $k$, and upper valve $l$, opening into the condenser. The valve $c$ being again adjusted to admit steam to the cylinder D, a repetition of the hereinbefore-described action takes place. A pipe, $m$, connecting the condenser F with the pipe $i$, and fitted with a loaded valve, $n$, serves to admit steam or vapor from the condenser to the pipe $i$ whenever the pressure in the upper portion of the latter is largely in excess of the pressure of the condenser, thus admitting vapor from the condenser to the pipe $i$, to effect draft or condensation therein on starting the apparatus, or at other times.

Referring, in the next instance, to Figs. 2 and 3 of the drawing, the modification there shown is substantially a similar apparatus, so far as the principle of action is concerned; but by it I avoid a difficulty which is incidental to the construction of apparatus shown in Fig. 1, namely, the cooling of the cylinder D by the admission of water to it above the piston, which produces a partial condensation of the steam in the cylinder, thereby prejudicially affecting the economical and efficient action of the apparatus. To remedy this defect two separate cylinders, D D', are used, the one, D, of them being a steam-cylinder, and the other, D', a water-cylinder. These cylinders may be arranged horizontally and in the same axial line, the piston of the steam-cylinder and that, E', of the water-cylinder being connected by the same rod, so as to work in unison. The apparatus also differs from that shown in Fig. 1 by being double-acting, for the purpose of keeping up a continuous or uninterrupted action. This involves duplication of certain parts, but no essential change in the principle of operation. A is the steam-inlet, and B B the valve-chests, containing valves for alternately admitting steam to and exhausting it from opposite sides of the piston in the cylinder D. The pump or water-cylinder D′, it is desirable should exceed in length a little more than one-half the stroke of its piston, and the latter be fitted with duplicate leather packings on its edges. The steam, as it is admitted by the valves in the chests B B alternately to opposite sides of the piston in the cylinder D, causes the piston E′ of the water-cylinder to be moved forward, first in the one direction and then in the other, and so to pass the water on the advancing side of the piston E′, in the cylinder D′, up through either valve $b\,b_1$ alternately and by branches, into a common rising pipe, $c$, to a height corresponding with the pressure of the steam on the engine-piston, either valve $b$ alternately being kept closed to prevent return of the raised water. Simultaneously with this action the steam that had previously done its duty in the engine-cylinder, on the opposite side of the piston in the latter, is passed by the valve in each chest B alternately, through the pipe $d$, to the condenser F. The condenser F being arranged at a greater altitude than the pump or water-cylinder D′, the water contained in the former will then run by the pipe $e$, through one or other (according to the direction in which the piston E′ is traveling) of the valves $f$, into the pump-cylinder D′, while the steam passes through either valve $g$ and pipe $h$, and, mingling with the water as it escapes through the valve $f$, produces a prompt and sufficient condensation, as already described with reference to Fig. 1. The vacuum thus produced will have the effect of filling the condenser, causing the water in the supply-pipe $i$ to rise from a depth corresponding with the vacuum produced. The devices for shifting the valves, and for alternating the action of the apparatus as regards the operation of the steam and water pistons from opposite ends of their respective cylinders, may be made automatic in various ways or by a variety of means, which it is not necessary here to describe. Inasmuch as the admission of the steam into the cylinder D, and the supply of water to the cylinder D′, also the effected condensation and the feed or supply of the condenser, operate alike on both sides of the working pistons, the propelling action of the steam will be relieved of counter pressure. Thus the pressure on the pump or water-piston not only counterbalances the atmospheric pressure on the steam-piston, but the escaping steam from the engine-cylinder, meeting the water of condensation, causes a vacuum to be produced, which raises the water in the pipe $i$ to a height corresponding with the pressure of the atmosphere, or nearly so.

Claim.

What is here claimed, and desired to be secured by Letters Patent, is—

The combination of the water-cylinder and its piston E or E′, set in motion either directly or indirectly by the pressure of steam from the boiler, as described, the elevated condenser F, the steam-pipes $d$ and $h$, and valve or valves $g$, the water-pipes $c\,e\,i$, and valves $b\,f$, the whole being arranged for operation in relation with each other, substantially as and for the purposes herein set forth.

FRIEDRICH AUGUST FISCHER.

Witnesses:
PETER BARTHEL,
FRANZ WIRTH.